(12) United States Patent
Arslan et al.

(10) Patent No.: US 10,014,025 B1
(45) Date of Patent: Jul. 3, 2018

(54) SYSTEM AND METHOD FOR TAPE LAYOUT OPTIMIZATION

(71) Applicant: Quantum Corporation, San Jose, CA (US)

(72) Inventors: Suayb S. Arslan, Sariyer/Istanbul (TR); Turguy Goker, Solana Beach, CA (US); Jaewook Lee, Aliso Viejo, CA (US); Hoa Le, Orange, CA (US)

(73) Assignee: QUANTUM CORPORATION, San Jose, CA (US)

( * ) Notice: Subject to any disclaimer, the term of this patent is extended or adjusted under 35 U.S.C. 154(b) by 0 days.

(21) Appl. No.: 15/655,289

(22) Filed: Jul. 20, 2017

(51) Int. Cl.
| | |
|---|---|
| *G11B 5/09* | (2006.01) |
| *G11B 20/00* | (2006.01) |
| *G11B 20/18* | (2006.01) |
| *G11B 20/12* | (2006.01) |
| *G11B 20/10* | (2006.01) |

(52) U.S. Cl.
CPC .... *G11B 20/00123* (2013.01); *G11B 20/1254* (2013.01); *G11B 20/1866* (2013.01); *G11B 20/1886* (2013.01); *G11B 2020/10722* (2013.01); *G11B 2020/1255* (2013.01); *G11B 2020/1893* (2013.01)

(58) Field of Classification Search
CPC ..... G11B 27/36; G11B 5/012; G11B 2220/20; G11B 27/3027; G11B 2220/90; G11B 20/1883

USPC ........ 360/48, 31, 53; 369/53.1, 53.15, 53.17
See application file for complete search history.

(56) References Cited

U.S. PATENT DOCUMENTS

| | | | |
|---|---|---|---|
| 8,139,304 B2 | 3/2012 | Cideciyan et al. | |
| 9,007,709 B2* | 4/2015 | Cideciyan | G11B 5/00813 360/31 |
| 9,355,675 B2* | 5/2016 | Nylander-Hill | G11B 5/00813 |
| 2010/0177422 A1 | 7/2010 | Cideciyan et al. | |
| 2016/0012850 A1* | 1/2016 | Feldman | G11B 20/1889 360/48 |

* cited by examiner

*Primary Examiner* — Nabil Hindi
(74) *Attorney, Agent, or Firm* — Roeder & Broder LLP; James P. Broder (57) ABSTRACT

A tape layout module for determining a tape layout allocation strategy for laying out data on tape, the data being organized into a plurality of fixed-size subdata sets with each of the plurality of subdata sets including a plurality of codeword interleaves, the tape including a plurality of media defect characteristics, includes a tape layout optimization system including a processor that receives information on the plurality of media defect characteristics. The tape layout optimization system determines the tape layout allocation strategy based at least in part on at least one of the plurality of media defect characteristics. Additionally, the tape layout optimization system can determine the tape layout allocation strategy further based on distance spectra between pairs of the plurality of codeword interleaves. Further, the tape layout optimization system can determine the tape layout allocation strategy by selectively utilizing at least one tape layout parameter.

20 Claims, 8 Drawing Sheets

SYSTEM AND METHOD FOR TAPE LAYOUT OPTIMIZATION

BACKGROUND

The Linear Tape Open (LTO) format is an open format magnetic tape data storage technology that enables users to have access to multiple sources of storage media products that will be compatible with one another. In current LTO tape drives, variable-length blocks of user data are received from a host interface and are segmented to create fixed-size data blocks or data sets. These data sets are further broken down into smaller but equal-size units known as subdata sets (SDSs). An SDS is typically organized into a two-dimensional array of rows and columns of data symbols. Each row of data symbols in the two-dimensional array may be made up of multiple interleaved data and parity symbols. Error Correction Coding (ECC) is typically generated for each row and each column in the array to protect the data contained therein. More specifically, ECC parity bytes are generated for each row that are appended to each row to create multiple codewords (e.g., four for LTO 6 and LTO 7 drives and likely to increase in future generations) that include both data and parity symbols. Each row of encoded SDS is referred to as one codeword interleave (CWI). Additionally, CWIs are also encoded with ECC parity bytes for each column that are appended to each column to generate vertical protection for the segmented user data, summing up to N CWIs per SDS.

The rows of each SDS, i.e., the CWIs, with the possibility of header and other metadata information having been added thereto, are distributed across and along the tape in a number of passes called wraps. In each wrap, based on the number of tracks T, CWIs are allocated to each track such that spatially correlated errors or defects on the magnetic tape surface will spread across multiple SDSs. Stated in another manner, in order to ensure that the number of errors in an SDS do not overpower the ECC codes used to protect the SDS, the rows of the SDS may be laid out on the magnetic tape in such a manner that, if errors occur spatially close to one another on the tape medium, the errors will be spread across multiple SDSs in the data set. Thus, in an attempt to minimize the burden on the ECC decoding of each SDS, such an allocation will ideally even out the correlated errors that happen on magnetic tape by distributing CWIs over the distinct SDSs. Limiting the number of errors occurring in an SDS increases the probability that the ECC parity associated with the SDS will be powerful enough to correct the errors contained therein.

Recent developments in multi-track LTO tape drive systems paved the way for storing petabytes of data at very low costs as part of the green storage context in large scale deployments. This performance gain is due to various innovations that took place in further research for media characteristics, tape mechanics, head technology, tribology and advanced signal processing algorithms. Most of the today's tape technology relies on continuous operation in different conditions and environments in which the media and the data are subject to defective reads/writes and external wear and damage. Most of the survey data and experimental observations demonstrate that the majority of performance bottleneck is due to such external repeatable defects and associated correlated failures such as dead tracks. Physical constraints of tape and the guarantee of operation under different environmental conditions have led to advanced configurations such that the performances of signal processing and error correction coding algorithms are affected the least. One of the genuine features of the LTO format is in the way coded data is laid out along and across the magnetic tape surface.

In one application of such a tape layout process, LTO tape drives employ a set of "randomization" methods (also sometimes referred to herein as "layout parameters") in order to balance the distribution of CWIs on the tape surface. Such methods include, but are not limited to, track rotations (transverse to the tape), CWI set swaps, track swaps and odd/even indexed SDS separations, which are designed to evenly distribute CWIs on the tape and thereby decorrelate error locations on the tape from error locations within each SDS. CWIs from an SDS may be periodically swapped between even and odd data tracks because even data tracks and odd data tracks may have systematic differences. Such systematic differences may be the result of recording head design, electronics configuration, signal line routing, or the like.

One drawback that has been seen with such methods is that they do not substantially improve the separation distance between CWIs to achieve optimal decorrelation. Subsequent efforts have proposed to maximize the minimum separation distance between CWIs belonging to the same SDS, while evening out the CWI set and track distribution, in order to make each SDS have almost the same decoding performance and data reconstruction reliability. Unfortunately, such subsequent efforts have also experienced certain drawbacks, as optimal decorrelation of errors is not always achieved depending upon the types of defects being seen.

SUMMARY

The present invention addresses a problem related to the present state of LTO tape layout allocation strategies and methodologies (codeword allocation on the physical medium—concerning both logical and physical layout design) and proposes an optimization procedure given the type, size and frequency of media defects and statistics. Accordingly, the present invention has been developed to provide an improved tape layout design for reliable ECC decoding. More specifically, the present invention presents a generalized codeword layout and allocation strategy by exploring the distance spectra of encoded data set elements. Based on such layout constructions, the present invention endeavors to minimize or otherwise limit the effect of media defects on the decoding performance of the tape and correspondingly increase data retention reliability. In particular, the present invention substantially improves such tape layout designs by incorporating side information such as media defect statistics into the optimization problem in order to achieve the best ECC decoding performance for the given defect/error model of interest. Additionally, as provided herein, decoding performance of the tape consists of one independent decoding for each SDS. Thus, the objective of the present invention is not only to limit the effect of media defects, but also distribute the effect evenly between each of the independent decodings.

In various embodiments, the present invention is directed toward a tape layout module for determining a tape layout allocation strategy for laying out data both logically and physically on tape, the data being organized into a plurality of fixed-size subdata sets with each of the plurality of subdata sets including a plurality of codeword interleaves, the tape including a plurality of media defect characteristics. In such embodiments, the tape layout module includes a tape layout optimization system including a processor that receives information on the plurality of media defect characteristics. The tape layout optimization system determines the tape layout allocation strategy based at least in part on at least one of the plurality of media defect characteristics. In some applications, the plurality of media defect characteristics are reproducible.

In some embodiments, the tape layout optimization system determines the tape layout allocation strategy based at least in part on each of the plurality of media defect characteristics. Additionally, the tape layout optimization system can determine the tape layout allocation strategy further based on distance spectra between pairs of the plurality of codeword interleaves.

In certain embodiments, the tape layout optimization system generates a plurality of coefficients, $\alpha_i(b_i)$, that are the result of a modeling of the plurality of media defect characteristics. This may be determined and fixed for a given media type and manufacturing process. In some such embodiments, the tape layout optimization system determines the tape layout allocation strategy by computing a weighted separation coefficient (WSC), $WSC(s) = \alpha_1(b_1)c_1 a_2 (b_2)c_2 + \ldots + \alpha_U(b_U)c_U$, where $b_i$ represents the i-th unique element of a distance spectra between pairs of the plurality of codeword interleaves, $c_i$ represents the count of the unique element $b_i$, and U represents the set of all possible distances for a given layout.

Additionally, in some embodiments, the tape layout optimization system determines the tape layout allocation strategy by selectively utilizing at least one tape layout parameter. Further, the tape layout optimization system can determine the tape layout allocation strategy by selectively utilizing a plurality of tape layout parameters. In certain such embodiments, the plurality of tape layout parameters are selected from a group consisting of track swaps, codeword interleave set swaps, track rotations, and odd/even indexed subdata set separations.

The present invention is further directed toward a data flow system for a tape drive including (i) a data intake system that receives a plurality of variable-length data blocks from a host device; (ii) a data preprocessing system that converts the plurality of variable-length data blocks into a plurality of fixed-size data sets, the data preprocessing system then converting the plurality of fixed-size data sets into a plurality of fixed-size subdata sets with each of the plurality of subdata sets including a plurality of codeword interleaves; and (iii) the tape layout module as described above that determines a tape layout allocation strategy for laying out the plurality of codeword interleaves on tape.

Additionally, the present invention is further directed toward a method for determining a tape layout allocation strategy for laying out data on tape, the data being organized into a plurality of fixed-size subdata sets with each of the plurality of subdata sets including a plurality of codeword interleaves, the tape including a plurality of media defect characteristics, the method including the steps of (A) receiving information on the plurality of media defect characteristics with a tape layout optimization system including a processor; and (B) determining the tape layout allocation strategy with the tape layout optimization system based at least in part on at least one of the plurality of media defect characteristics.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a tape layout optimization system and method for reliable Error Correction Coding (ECC) decoding that is based on media defect characteristics. More particularly, the present invention substantially improves tape layout designs by incorporating side information such as media defect/error statistics (i.e. especially media defect/error statistics that are repeatable and/or reproducible) into the optimization problem to achieve the best overall separation between codeword interleaves (CWIs) as they are laid out on the tape and best ECC decoding performance. Additionally, the tape layout design is further optimized through use of the present invention by creating a more balanced design that takes into consideration separation between CWIs for all subdata sets (SDSs).

As described herein, the various steps of the tape layout optimization system and method can be performed in any suitable order to achieve the desired goal. Additionally, it is appreciated that the system and method described in detail herein can be implemented through a series of instructions to be carried out via one or more computer algorithms. Further, it is also appreciated that the series of instructions may be provided to a processor of a general-purpose computer, a special-purpose computer, or another suitable programmable data processing apparatus. The computer algorithms may also be stored in a computer-readable storage medium or be loaded directly onto a computer or other suitable programmable data processing apparatus to cause a series of operational steps to be performed by the computer or other programmable apparatus.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
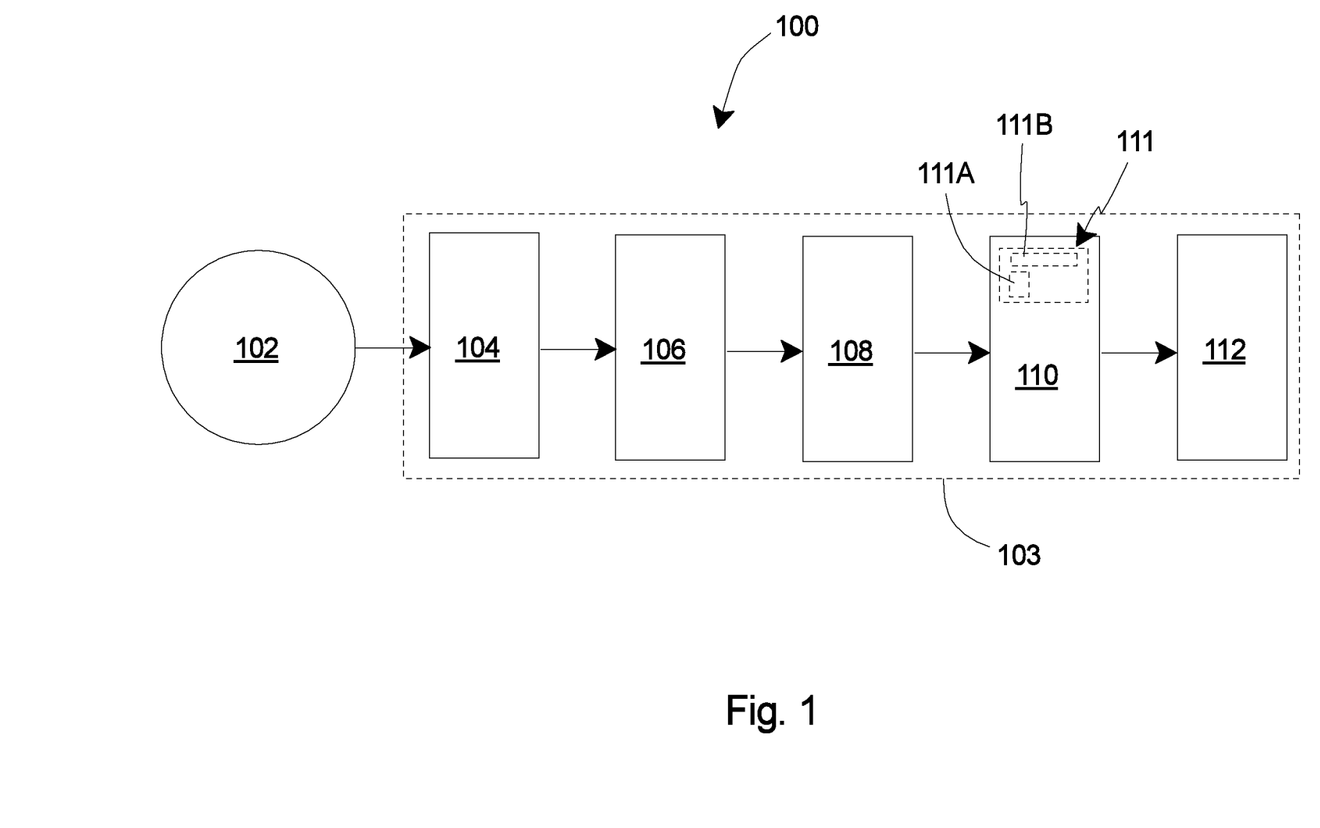
FIG. 1 is a simplified schematic illustration of one representative embodiment of a data flow system for a tape drive, the data flow system including a tape layout module that incorporates a tape layout optimization system having features of the present invention.

FIG. 1 is a simplified schematic illustration of one representative example of a data flow system 100 for a tape drive. The specific data flow system 100 illustrated in FIG. 1 is presented only as one possible method for data flow to be provided for a tape drive, and is not intended to be limiting in any manner. Moreover, it is appreciated that other data flows may also benefit from the tape layout optimization system described in detail herein, and such data flow systems and methods are thus intended to be encompassed within the scope of the invention.

The design of the data flow system 100 can be varied. In certain embodiments, as shown in FIG. 1, the data flow system 100 can include a host device 102, a data intake system 104, a data preprocessing system 106, a data protection system 108, a tape layout module 110, and a layout processing module 112. Each of the systems and modules illustrated and described in FIG. 1 can further include one or more subsystems that work in conjunction with one another to perform the overall functions of each system and module. Additionally, in some such embodiments, one or more of the data intake system 104, the data preprocessing system 106, the data protection system 108, the tape layout module 110 and the layout processing module 112 can be incorporated within a data processing apparatus 103 (illustrated as a dashed box), e.g., a suitable type of computing device. Alternatively, the data flow system 100 can include more systems and modules or fewer systems and modules than those specifically illustrated in FIG. 1. Still alternatively, it is appreciated that the illustrated flow of data through the data flow system 100 shown in FIG. 1 can be performed in a different manner, e.g., in a different order, than what is described herein.

As an overview, the tape layout module 110 is specially configured to enable a substantially improved and/or optimized tape layout for reliable ECC decoding that is based on media defect characteristics. More specifically, in various embodiments, the tape layout module 110 includes a tape layout optimization system 111 (illustrated in phantom) having one or more processors 111A (illustrated in phantom) and one or more circuits 111B (illustrated in phantom) that utilize specially designed computer algorithms for purposes of enabling a substantially improved and/or optimized tape layout for reliable ECC decoding that is based on media defect characteristics. Additionally, in some such embodiments, the tape layout optimization system 111 can be configured to substantially improve and/or optimize the selection and use of at least one, and possibly a plurality of, layout parameter for purposes of laying out data, i.e. both logically and physically, on tape. More particularly, as provided herein, the selection and use of the layout parameter(s) is based at least in part on the identification of media defect characteristics that may be present within the tape medium. The layout parameter(s) selected by and utilized within the tape layout optimization system 111 can include, but are not limited to, track rotations (TR), CWI set swaps (SS), track swaps (TS), and odd/even indexed SDS separations (SDSS).

In certain embodiments, the host device 102 can be utilized to provide a sequence of bytes contained within variable-length data blocks 214 (illustrated in FIG. 2) to the data intake system 104. The variable-length data blocks 214 that are provided to the data intake system 104 may be any size up to a maximum size supported by a tape drive. In some embodiments, the data intake system 104 may perform a cyclic redundancy check (CRC) on the incoming data blocks 214, and thus may add any suitable CRC information to these data blocks 214.

The variable-length data blocks 214 are then passed along to the data preprocessing system 106 where the variable-length data blocks 214 are converted into a more suitable format for tape layout. For example, in certain embodiments, the variable-length data blocks 214 may be compressed and/or encrypted as desired. Additionally, the data preprocessing system 106 can also include a data organization system 216 (illustrated in FIG. 2).

Figure 2:
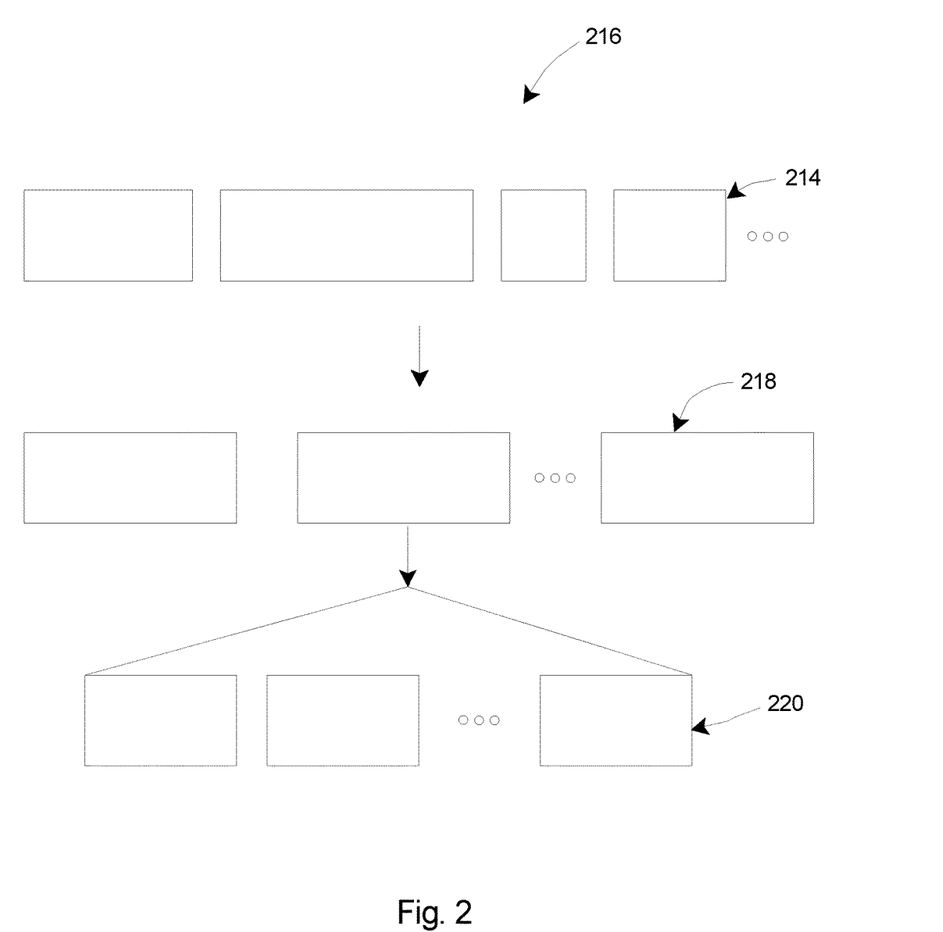
FIG. 2 is a simplified schematic illustration of an embodiment of a data organization system that can be utilized within the data flow system, the data organization system illustrating how variable-sized data blocks received from a host device can be broken into fixed-sized data sets, and then into smaller fixed-sized subdata sets (SDS))

FIG. 2 is a simplified schematic illustration of an embodiment of the data organization system 216 that can be utilized within the data flow system 100. In particular, within the data organization system 216, the variable-length data blocks 214, which may or may not have been compressed and/or encrypted in a suitable manner, are initially broken down into a plurality of data sets 218 that are of a fixed size. The number of bytes in each data set 218 can be varied depending upon the requirements of the data flow system 100 and/or the tape drive with which the data is being used. During this process, the data organization system 216 begins filling a first data set 218 at a first byte of the data set 218 and continues until a last byte of the data set 218. The data organization system 216 continues this process until all of the data blocks 214 have been filled into the fixed-size data sets 218. Subsequently, the data sets 218 may in turn be broken down into subdata sets 220 (SDS) that are also of a fixed size. The number of bytes in each subdata set 220 can also be varied depending upon the requirements of the data flow system 100 and/or the tape drive with which the data is being used.

Referring again to FIG. 1, once the variable-length data blocks 214 (illustrated in FIG. 2) have been preprocessed within the data preprocessing system 106 and converted into a plurality of fixed-size subdata sets 220, the fixed-size SDS 220 are then passed to the data protection system 108.

Figure 3:
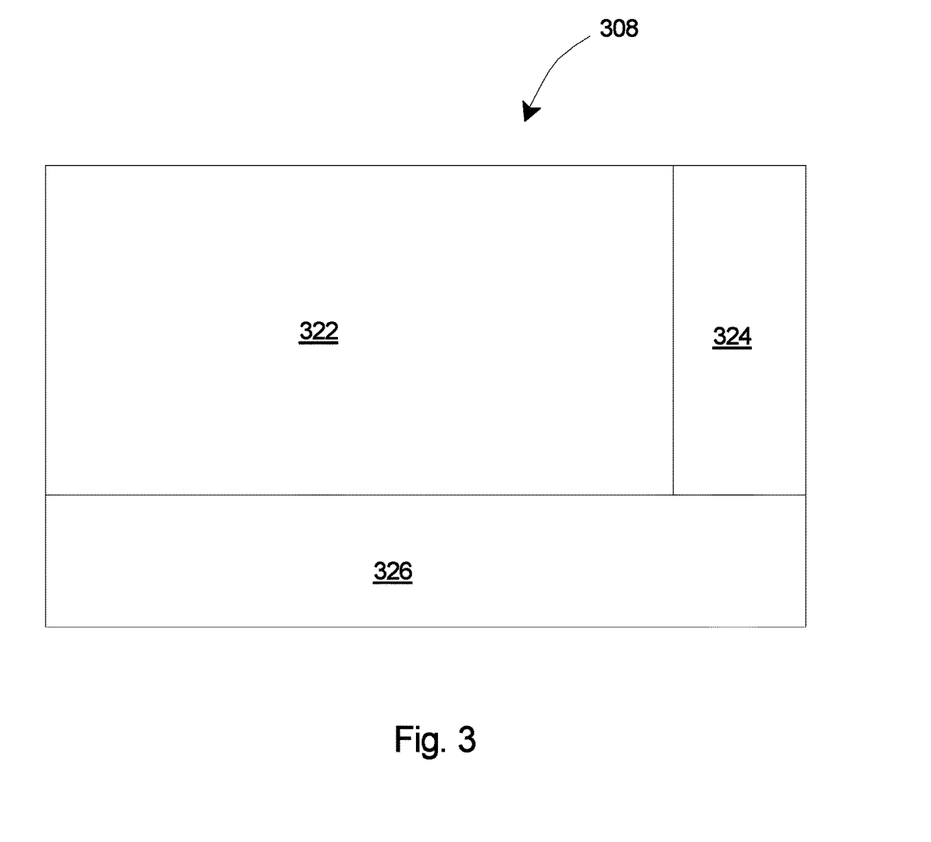
FIG. 3 is a simplified schematic illustration of an embodiment of a data protection system that can be utilized within the data flow system, wherein data of an SDS is organized into a two-dimensional array, with ECC parity appended to the SDS array, and with each row of the ECC-protected data array being a codeword interleave (CWI)

FIG. 3 is a simplified schematic illustration of an embodiment of the data protection system 308 that can be utilized within the data flow system 100. Initially within the data protection system 308, each SDS 220 (illustrated in FIG. 2) may be organized into a two-dimensional array of data 322 (illustrated as a block in FIG. 3). The number of rows and columns, and the size of each row and each column, within the two-dimensional array of data 322 can be varied to suit the amount of data included within the SDS 220. In particular, in one embodiment, the data from within the SDS 220 can be used to fill the two-dimensional array of data 322 on a row-by-row basis, with each row filling out a desired number of columns. Alternatively, in another embodiment, the data from within the SDS 220 can be used to fill the two-dimensional array of data 322 on a column-by-column basis, with each column filling out a desired number of rows.

Subsequently, error correction coding (ECC) may be applied to the SDS data array 322. More particularly, the SDS data array 322 may be passed to a row ECC encoder. The row ECC encoder may generate row ECC parity data 324 for each row in the SDS data array 322 and append the row ECC parity data 324 to the SDS data array 322. The row ECC parity data 324 is illustrated simply as a block positioned adjacent to the SDS data array 322. In certain embodiments, headers (not shown) and other metadata may be appended to each row in the SDS data array 322 prior to utilizing the row ECC encoder to generate the row ECC parity data 324 for each row in the SDS data array 322 that is appended to the SDS data array 322

Once the row ECC parity data 324 is generated and appended to the SDS data array 322, the SDS data array 322 may then be passed to a column ECC encoder which generates column ECC parity data 326 for each column in the SDS data array 322. The column ECC parity data 326 is illustrated simply as a block positioned below and adjacent to the SDS data array 322 and the row ECC parity data 324.

The row ECC parity data 324 protects each row of the SDS data array 322 while the column ECC parity data 326 protects each column in the SDS data array 322. Additionally, in certain embodiments, the row ECC parity data 324 and/or the column ECC parity data 326 can also protect any headers or other metadata that may have been appended to each row in the SDS data array 322. Each row of the ECC-protected data array is now referred to as a codeword interleave (CWI).

It is appreciated that in certain applications, due to linearity of the ECC, the row ECC parity data 324 and the column ECC parity data 326 can be appended to the SDS data array 322 in either order. In particular, the row ECC parity data 324 can be appended to the SDS data array 322 prior to the column ECC parity data 326, such as is shown in FIG. 3. Alternatively, the column ECC parity data 326 can be appended to the SDS data array 322 prior to the row ECC parity data 324.

Referring again to FIG. 1, the ECC-protected data array is next passed along to the tape layout module 110. In particular, the tape layout module 110 is configured to distribute the data array, the ECC parity, and the headers and other metadata, i.e. the CWIs, across different tracks and in different orders for recording on the magnetic tape. As provided in detail herein, the tape layout module 110 can incorporate the tape layout optimization system 111 that utilizes media defects and correlated error statistics to provide the best ECC decoding performance for the given defect/error model of interest. Additionally, as noted above, the tape layout optimization system 111 substantially improves and/or optimizes the selection of type and number of the layout parameters that may be utilized in the actual layout of the data on tape.

Figure 4:
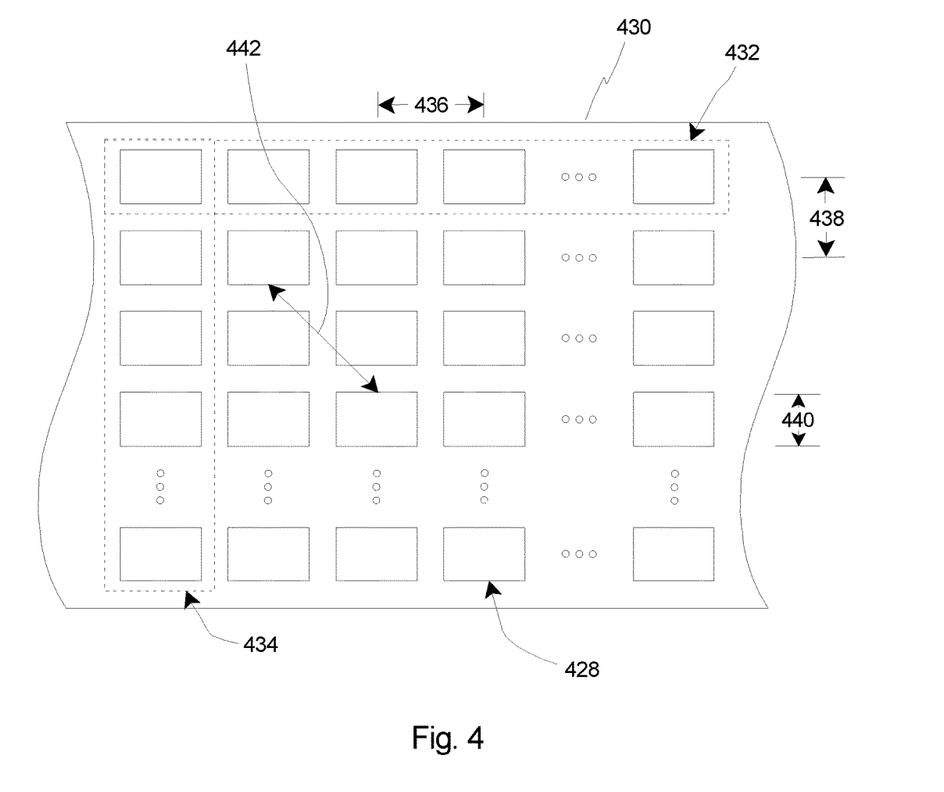
FIG. 4 is a simplified schematic illustration of a representative embodiment of a magnetic tape layout of CWIs on the magnetic tape.

FIG. 4 is a simplified schematic illustration of a representative embodiment of a tape layout of a plurality of CWIs 428 laid out on magnetic tape 430. As shown, the magnetic tape 430 can include a plurality of tracks 432 (e.g., 8, 16, or 32 tracks, and illustrated for example as a dashed box in FIG. 4) that are laid out along the length of the magnetic tape 430.

In certain applications, the CWIs 428 are distributed across and along the magnetic tape 430 in a number of passes referred to herein as wraps. In each wrap, based on the number of tracks 432, T, on the tape 430, the CWIs 428 can be allocated to each track 432 such that spatially correlated errors or defects on the magnetic tape surface will spread across multiple SDSs 220 (illustrated in FIG. 2). In an attempt to minimize the burden on the ECC decoding of each SDS 220, such an allocation will ideally even out the correlated errors that happen on magnetic tape by distributing CWIs over the distinct SDSs 220. In other applications, the tape drive can read and/or write multiple longitudinal tracks 432 on the magnetic tape 430 substantially simultaneously. For example, with a magnetic tape 430 including T simultaneously recorded tracks 432, T CWIs 428 are written substantially simultaneously, one CWI 428 per track 432. In some such applications, the group of simultaneously written CWIs 428 is referred to herein as a CWI set 434 (illustrated for example as a dashed box in FIG. 4). Thus, as the tape head moves along the magnetic tape 430, the CWI sets 434 are read from or written to the magnetic tape 430. FIG. 4 illustrates a plurality of CWI sets 434 that have been laid out across the magnetic tape 430.

Also shown in FIG. 4 within the tape layout is an interset distance 436, an intertrack distance 438, and a track width 440. The interset distance 436 is the distance from the middle point of one CWI 428 to the middle point of the next CWI 428 within a track 432. The intertrack distance 438 is the distance from the middle point of one CWI 428 to the middle point of the next CWI 428 within a CWI set 434, i.e. from one track 432 to the next track 432. The track width 440 is the width of each individual track 432. As shown, the interset distance 436 and the intertrack distance 438 are functions of linear density, magnetic tape length and width. It is appreciated that the specific interset distance 436, intertrack distance 438 and track width 440 can vary depending on the particular tape format being utilized. For example, in certain non-exclusive alternative embodiments, the interset distance 436 can be between approximately 350 µm and 400 µm, the intertrack distance 438 can be between approximately 70 µm and 90 µm, and the track width can be between approximately 1.5 µm and 2.5 µm. Alternatively, the interset distance 436, the intertrack distance 438 and the track width 440 can have values different than those specifically listed herein above.

Additionally, FIG. 4 also shows that a physical CWI separation 442 can be measured between any pair of CWIs 428 within an SDS 220 as laid out on the magnetic tape 430. For example, if there are N CWIs 428 per SDS 220, then there would be $N(N-1)/2$ different pairs of CWIs 428. Evaluating the CWI separation 442 for the full gamut of pairs of CWIs 428 in a given SDS 220 is sometimes referred to as the CWI separation distance spectra.

In certain applications, the physical CWI separation 442 is defined to be the physical Euclidian distance between any pair of CWIs 428 within a given SDS 220 based on their tape allocation, specifically considering the midpoint of each CWI 428 as the point of reference. Alternatively, in other applications, the physical CWI separation 442 can be measured between any pairs of CWIs 428 within the SDS 220 by using a different point of reference within the CWI, e.g., a corner-to-corner measurement.

Generally speaking, the greater the physical distance between CWIs 428 of the same SDS 220, the less likely it is that a single error event will affect more than one CWI 428 in an SDS 220. Thus, as provided herein, one of the main objectives of tape layout designs is to maximize the minimum separation between CWIs 428 belonging to a particular SDS 220. The minimum separation between CWIs 428 can be defined as the minimum CWI separation 442 for all CWI pairs of all SDSs 220 dictated by the tape layout design format. Unfortunately, considering only the minimum separation may not address the requirements of today's tape recording technology in which the operational performance is exacerbated due to defects and long correlated error bursts while used with narrow heads. It is appreciated that such media defects and/or dead track or stripe errors can cause different degrees of degradation to the system, especially when the minimum CWI separation 442 is different for different SDSs 220. Various specific embodiments of the tape layout optimization system 111 (illustrated in FIG. 1) having features of the present invention, which are specially configured to compensate for such defects and error types, will be described in greater detail herein below.

Referring again to FIG. 1, once the CWIs 428 (illustrated in FIG. 4) have been laid out on the tape 430 (illustrated in FIG. 4), the data sequences may then be processed in any suitable manner within the layout processing module 112. For example, in some embodiments, the layout processing module 112 may include one or more randomizers which perform additional signal processing on the data, run length limited (RLL) encoders that may then transform the spectra of the information so that it is better suited for magnetic recording, and multiplexers that may then multiplex synchronization information, such as variable frequency oscillators (VFOs), sync characters, or the like, into the information to enable it to be synchronized when read.

Figure 5:
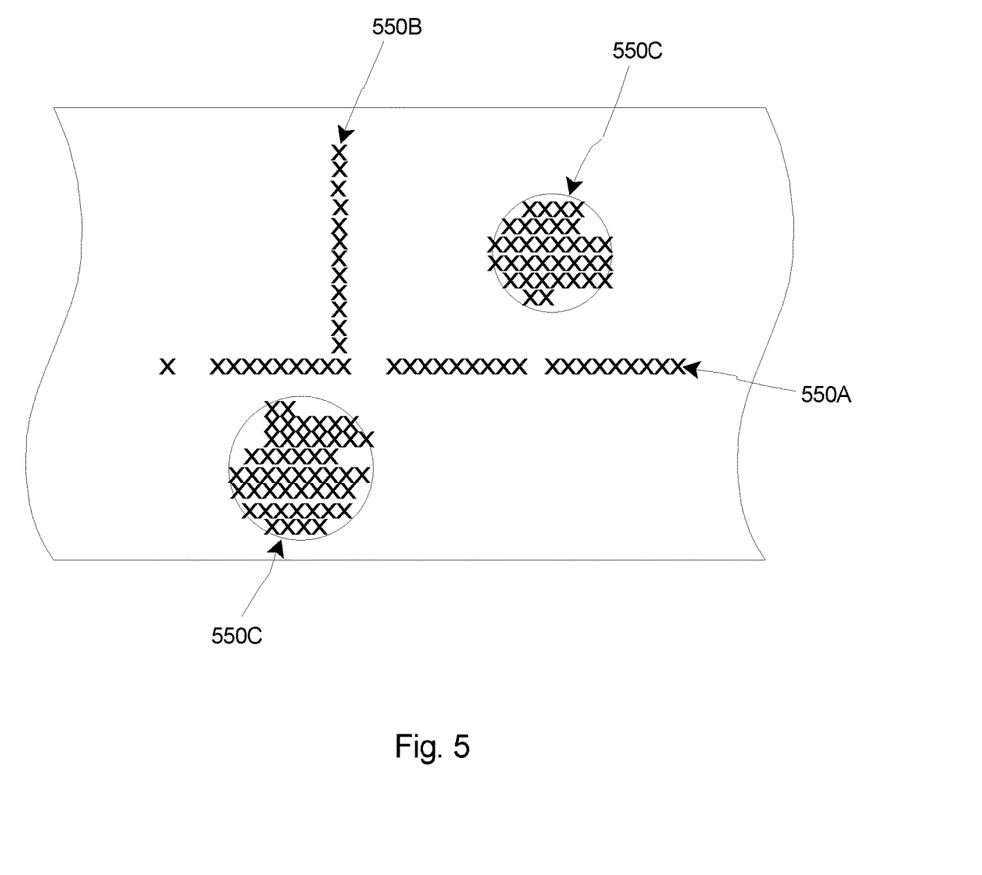
FIG. 5 is a simplified schematic illustration of a representative embodiment of the types of error patterns that may occur within the magnetic tape layout.

As provided herein, it is appreciated that certain types of error patterns may exist as the data is laid out on the magnetic tape 430. FIG. 5 is a simplified schematic illustration of a representative embodiment of the types of error patterns that may occur within the tape layout on magnetic tape 530. More particularly, FIG. 5 illustrates three general types of defects/correlated errors that one is likely to encounter within the tape layout, which may be the source of a performance bottleneck. For example, FIG. 5 illustrates along-track errors 550A (illustrated with a series of "x"s) that lie along the tape 530, and across-track errors 550B (illustrated with a series of "x"s), or stripe errors, that lie across the magnetic tape 530. The along-track errors 550A that occur parallel to the tape 530 may affect multiple CWIs 428 (illustrated in FIG. 4) in one or more tracks 432 (illustrated in FIG. 4) along the length of the tape 530. The along-track errors 550A may be the result of, for example, defective or clogged write or read heads, scratches along the length of the tape 530, manufacturing defects in the tape 530, debris on the tape 530, changes in environmental conditions during read/write operations, or the like. The across-track errors 550B that occur transverse to the tape 530 may affect multiple tracks 432 in a CWI set 434 (illustrated in FIG. 4). The across-track errors 550B may be the result of, for example, head tracking problems, scratches across the tape 530, edge damage to the tape 530, manufacturing defects in the tape 530, debris on the tape 530, or the like.

In addition to the along-track errors 550A and the across-track errors 550B, FIG. 5 further illustrates that the tape 530 may include other random errors 550C (illustrated with a series of "x"s) that may occur randomly transverse to and along the tape 530. These random errors 550C may be caused by isolated media defects that are repeatable/reproducible, and which are typical in magnetic recording media. Examples of such random errors 550C are illustrated in FIG. 5 as being captured within generally circular areas on the tape 530. It is appreciated that such circles including the random errors 550C can have a radius r and can happen anywhere on the tape 530. As the radius of the circle increases, the hazard caused on the ECC decoding becomes elevated so as to make decoding and retrieving data accurately even more problematic.

In one representative example, as noted above, the minimum separation of CWIs can be defined to be the minimum of all CWI pairs of all SDSs dictated by the tape layout design format. Additionally, assuming that a given layout design has a minimum separation $s_{min}$, if $r<s_{min}/2$, then the maximum number of CWIs that belongs to a specific SDS that can be contained in the circle shown is 1. If all of the defect sizes were limited to such particular sample defect size, it would be enough to consider only the minimum CWI separation. However, this may not often be the case. This argument also demonstrates that the defect size and the defect appearance frequency (along with its reproducibility) have different effects on the CWIs separated by certain physical distance. The effect on CWIs closely placed on tape is usually larger than the CWIs placed far apart. Thus, such a characterization might be useful from a tape layout design perspective.

Various components, aspects and embodiments of the tape layout optimization system 111 (illustrated in FIG. 1) having features of the present invention will now be discussed in greater detail. It is understood that any of the various components, aspects and embodiments of the tape layout optimization system 111 as described herein can be combined in any suitable manner to produce even further embodiments. Thus, it is further appreciated that the description of any particular components or aspects of the tape layout optimization system 111 in conjunction with one or more specific embodiments is not intended to be limiting in any manner.

Additionally, knowledge of and assumptions relating to various layout parameters can be incorporated into the tape layout optimization system 111 in order to determine the best tape layout in any given situation. More particularly, it is understood that certain layout parameters are factored into any embodiment of the tape layout optimization system 111. For example, the layout parameters that can be factored into the tape layout optimization system 111 include, but are not limited to, the number of SDSs in the data to be laid out on the tape, the number of tracks on the tape, the codeword length, the number of track rotations (TR) in terms of CWIs, the number of track swaps (TS), the number of CWI set swaps (SS), and the separation between the CWIs of even/odd indexed SDSs (SDSS).

As part of the tape layout optimization system 111, one of the primary objectives of the tape layout design optimization is to make sure that the relative CWI separations for each SDS are almost the same. In this manner, the same ECC decoding performance may be expected for each SDS, and equal protection can be achieved across SDSs for any correlated error scenarios. Thus, with application of the present invention, it is possible to provide reliable ECC decoding performance that is approximately equal across all SDSs within a given data set. Stated in another manner, use of the present invention takes into consideration CWI separations for each of the SDSs within a given data set for optimizing the tape layout allocation strategy. By examining the CWI distance separation for all SDSs within the given data set, the present invention is able to generate a tape layout with a more balanced design that provides better distance properties overall.

In the present invention, since there is no distinguishing between the type of data in a given data set, there is also no differentiation with the encoded data when the encoded data is allocated over the physical tape medium. However, once the desired side information regarding the type, size and frequency of media defects and statistics (data being mission critical, vital, sensitive or non-critical) is provided, further arrangement can be made and different SDSs can be treated differently while allocating the associated CWIs over the tape surface. This is due to the understanding that for a particular minimum separation distance, the effect of various defects on different CWIs can be different.

CWI separation distance spectra, as introduced above, is inherited from coding theory that considers all pairwise distance between all the CWIs of interest, i.e. all of the CWIs for a given SDS. Additionally, the present invention is directed toward a tape layout optimization system 111 that evaluates potential tape allocation strategies to determine a substantially improved and/or optimized tape layout allocation strategy for a given SDS 220.

Figure 6A:
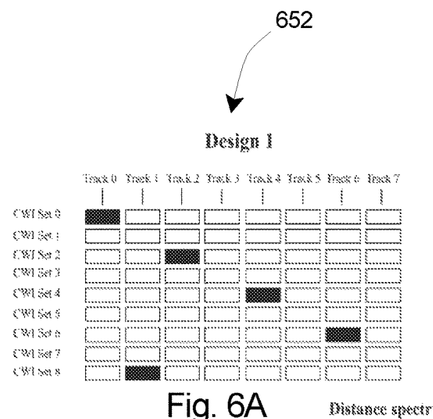
FIG. 6A is a representative example of a first tape allocation strategy for a first SDS.
Figure 6B:
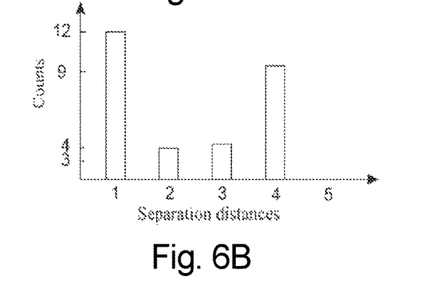
FIG. 6B is a histogram that illustrates CWI separation distances between pairs of CWIs based on the first tape allocation strategy illustrated in FIG. 6A.
Figure 7A:
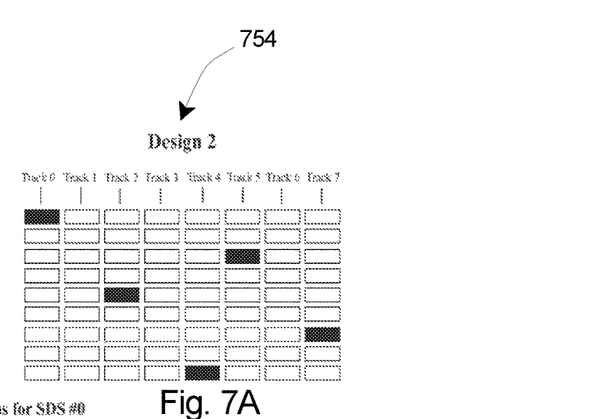
FIG. 7A is a representative example of a second tape allocation strategy for a second SDS.

As illustrated, for example, in FIGS. 6A and 6B, a histogram showing each unique CWI separation distance can be made to be able to obtain the distance spectra of a given tape layout allocation strategy for an SDS of interest. In particular, FIG. 6A is a representative example of a first tape allocation strategy 652 that could potentially be employed for a given SDS 220 (illustrated in FIG. 2). Additionally, FIG. 6B is a histogram that illustrates CWI separation distances between pairs of CWIs based on the first tape allocation strategy 652 illustrated in FIG. 6A. Somewhat similarly, FIG. 7A is a representative example of a second tape allocation strategy 754 that could potentially be employed for the given SDS. Additionally, FIG. 7B is a histogram that illustrates CWI separation distances between pairs of CWIs based on the second tape allocation strategy 754 illustrated in FIG. 7A.

In both tape allocation strategies illustrated in FIG. 6A and FIG. 7A, black boxes are utilized to denote all the CWIs that belong to the particular SDS of interest.

Figure 7B:
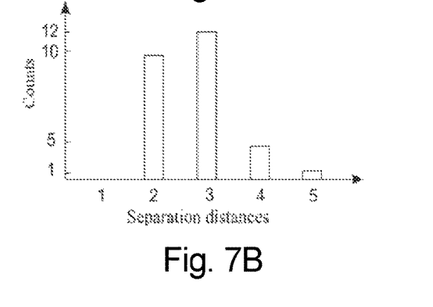
FIG. 7B is a histogram that illustrates CWI separation distances between pairs of CWIs based on the second tape allocation strategy illustrated in FIG. 7A.

As shown in FIG. 6B and FIG. 7B, for each histogram, the x-axis is used to show the possible distances between CWIs and the y-axis is used to show the counts of these distances. For a layout design that has N CWIs per SDS, distance spectra for the individual SDSs is a set represented by $$W(s) = \{w_1, w_2, \ldots, w_{N(N-1)/2}\} \quad \text{(Equation 1)}$$

where $w_j$ represents the j-th pair of CWIs. Since it is possible to have two CWI pairs that have the same physical separation, in certain embodiments it is preferred to express the same set with two different sets $B(s) = \{b_1, b_2, \ldots, b_U\}$ and $C(s) = \{c_1, c_2, \ldots, c_U\}$ where $b_i$ represents the i-th unique element of $W(s)$ and $c_i$ represents the count of the unique element $b_i$. Hence, the distance spectra can be plotted by putting $B(s)$ on the x-axis and $C(s)$ on the y-axis.

As provided herein, the CWI distance spectra can be used to evaluate, substantially improve and/or optimize the tape layout allocation strategy. In other words, the CWI distance spectra can be used as a performance measure in order to compare different tape layout allocation strategies. Further, the present invention provides that certain media defect statistics are also necessary in addition to the CWI distance spectra before deciding on which design is preferable. For such purpose, a set of coefficients $\alpha_i(b_i)$ (for i=1, 2, ..., U) is introduced where each coefficient characterizes the effect of distance-i separated CWIs on the number of CWIs poorly read due to defects and other type of correlated errors. Those coefficients are the result of modeling the defect characteristics of LTO tapes and media. Such computation is based on the defect, media type and how often they appear on tape surface. This coefficient can easily be extracted for a given media/drive technology combination, e.g., a Media 1/LTO 7 drive combination. By eliminating the random component of the noise and defects, reproducible patterns can determine the core of the coefficient values. It is understood that, as shown, the a is are functions of the separation distance $b_i$'s.

Before a final decision is made on a preferred tape layout allocation strategy, distance spectra information is combined with these data-driven coefficients, and a weighted separation coefficient (WSC) is computed for the given SDS (indexed by "s") as follows:

$$WSC(s) = \alpha_1(b_1)c_1 + \alpha_2(b_2)c_2 + \ldots + \alpha_U(b_U)c_U \quad \text{(Equation 2)}$$

For this particular example, i.e. comparing the tape layout allocation strategies illustrated in FIGS. 6A and 7A, it is assumed that the number of SDSs, S, the number of tracks, T, and the codeword length, N, are fixed and cannot be changed. Accordingly, the final choice for optimal tape layout would be based on the particular choice of layout parameter selections, e.g., track rotations, CWI set swaps, track swaps and SDS separations, such that WSC(0), WSC(1), ... WSC(S−1) are jointly minimized. It is appreciated that for some designs these weighted separation coefficients for different SDSs might be different i.e., that particular design allocates the burden due to defects unequally among different SDSs. Thus, different ECC decodings will end up with different decoding performances in such cases.

In alternative designs, the tape layout can include a balanced design, i.e. where the WSC values for each SDS are weighted substantially equally to one another, or an unbalanced design, i.e. where the WSC values for each SDS are not weighted equally to one another.

In a first example, the tape layout is assumed to include a balanced design. Additionally, for illustration purposes, the following sample (made-up) statistics can be used for U=5,

| $\alpha_1 = 0.83$ | $\alpha_2 = 0.79$ | $\alpha_3 = 0.71$ | $\alpha_4 = 0.22$ | $\alpha_5 = 0.02$ |
| --- | --- | --- | --- | --- | with the example distance spectra is as shown in FIGS. 6A and 7A. Since it is a balanced design, it is assumed that both designs satisfy WSC(0)=WSC(1)= ... =WSC(S−1). Thus, the cost function could be the sum of WSCs i.e., $\Sigma_i WSC(i)$ with this constraint. Standard linear programming tools can be applied to solve for the solution (maximization in this case) for the required spectra. However, mapping this solution to required parameters of the layout design is an integer programming problem and cannot be solved in polynomial time.

Since the distance spectra are both given for two designs shown in this example (and they are not necessarily optimal) and it is assumed to include balanced designs, it is possible to only focus on WSC(0). In computing WSC(0)s for both designs using Equation (2) above, it is determined that:
Design 1: WSC(0)=17.15
Design 2: WSC(0)=17.54

As a conclusion, it can be seen that Design 1 is preferable given the distance spectrum and defect characteristics of the tape (i.e. WSC(0) is lower for Design 1), although Design 1 has a minimum separation distance of 1 whereas Design 2 has a minimum separation distance of 2. This example shows in particular, an optimal design should take care of the statistics of defects and media/correlated errors as well.

Note that this approach with $\alpha_1=1$, and $\alpha_i=0$ for all other i, reduces the problem down to looking at minimum-separation-only approach, when deciding on a good tape layout. Thus, it is apparent that here a more generalized version of the previous design approaches is being proposed.

In a second example, the tape layout is assumed to include an unbalanced design. Stated in another manner, in some designs, WSC(0)≠WSC(1)≠ . . . ≠WSC(S−1) or maybe WSCs may be an ordered sequence depending on the requirements of the system. In this case, the cost function is still given by $\Sigma_i$WSC(i) and yet the constraint(s) can be imposed by the requirements of the application. For instance, different data types might be stored and sensitivity profiles of these data might not match. In that case, SDSs that bear mission critical information are allocated to the safe partitions/location of the tape for better reliability or accessibility.

Assuming S=4, and utilizing the same proposed tape layout allocation strategies shown in FIGS. 6A and 7A, we calculate WSC values as shown in the following table:

|  | WSC(0) | WSC(1) | WSC(2) | WSC(3) | WSC(4) |
|---|---|---|---|---|---|
| Design 1 | 17.15 | 17.15 | 18.05 | 18.05 | 17.55 |
| Design 2 | 17.54 | 17.54 | 18.05 | 18.05 | 18.23 |

As can be seen in this table, Design 1 always has smaller or equal WSC for all the SDSs. Therefore, Design 1 can be said to be a better design than Design 2. However, it might have been the case that some of the WSCs of SDSs of Design 1 are larger than that of the Design 2. In that case, it is more challenging to determine which design is preferable from a collective (considering all the SDSs) ECC decoding perspective. In that particular case, the relationship between sensitivity profile of the data, WSC and ECC decoding should also be analyzed.

If SDSs bear equally important information from a user perspective, it is advisable to consider WSC(0), WSC(1), . . . WSC(S−1) all together and generate one separation distance spectrum for WSC computation.

Figure 8:
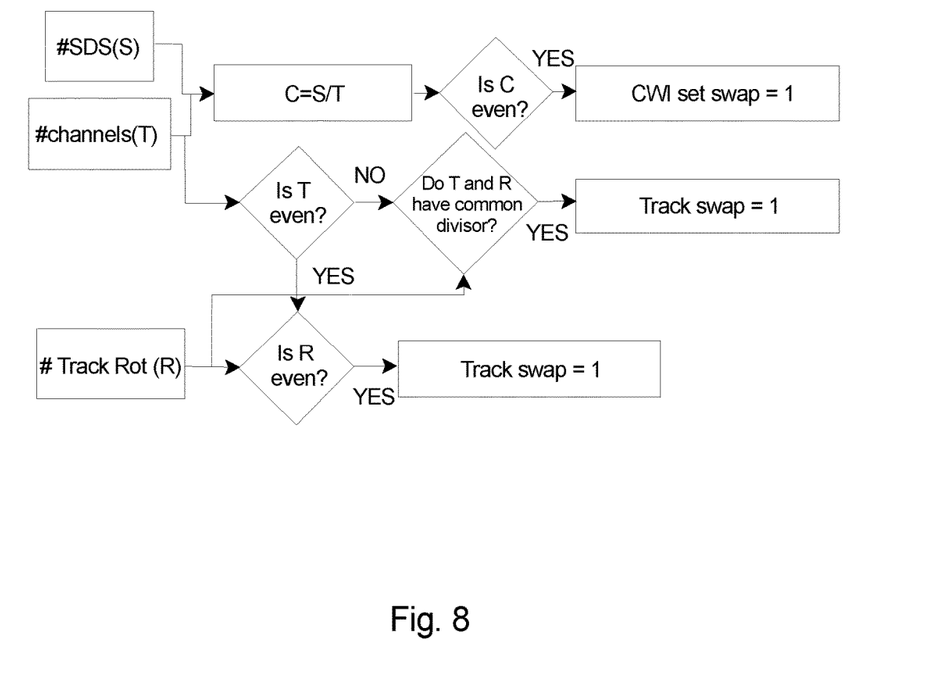
FIG. 8 is a flow chart for determining CWI allocation parameters for CWI set swaps and track swaps.

Based on the example layouts and associated distance spectra and media defects illustrated in FIGS. 6A-6B and FIGS. 7A-7B above, a substantially improved and/or optimized tape layout allocation strategy was chosen. However, as provided herein, it is desired to create and utilize a tape layout optimization system that can provide a more generalized method for CWI allocation. For such a tape layout optimization system, it is typically necessary to explicitly define the layout parameters of the layout design that can be substantially improved and/or optimized based on the optimal spectra to be found using the ideas/techniques provided above. Again, it is assumed that the number of SDS: S, number of tracks: T and codeword length N are the given parameters, set by different parties and cannot be changed. Thus, the following layout parameters are subject to optimization:
1) TR: Track rotation in terms of CWIs
2) TS: Number of Track swaps
3) SS: Number of CWI set swaps
4) SDSS: The separation between the CWIs of even/odd indexed SDSs It is understood that track swaps and set swaps may or may not be applied in any given situation. Here is provided a generic procedure to determine whether or not to employ swaps. At the beginning of the algorithm, the possible swaps are initially set to CWI set swap=0 and Track swap=0. Subsequently, the following procedure is utilized for making a decision on enabling the swaps. If swaps are allowed, then it is understood that TS and SS parameters also need to be determined. These parameters are usually determined by reasonable choices so as to minimize the number of parameters subject to optimization. For instance, the following procedure can be used to determine TS and SS and hence TR and SDSS will have to be substantially improved and/or optimized as described further below. More specifically, FIG. 8 is a flow chart for determining CWI allocation parameters for CWI set swaps and track swaps.

If Track swap=1 after the procedure, we have TS=M/T/2−1 unless otherwise stated.

If CWI set swap=1 after the procedure, SS=M/T−1 unless otherwise stated. For example for better CWI separation SS can be set to 1 without looking at the CWI set swap.

If CWI set swap=0 after the procedure, SS=1. Usually the half point in data set is chosen to do the single set swap.

After deciding on the swaps, TR and SDSS can be substantially improved and/or optimized to meet some optimization criterion using the defect statistics as explained in detail above. In fact, these layout parameters are integers and the optimization problem may require real numbers. In certain embodiments, the tape layout optimization system can either use relaxation methods for integer programming to generate effective solutions or use an exhaustive search on the good set of parameters to substantially improve and/or optimized the layout through running simulations.

Figure 9:
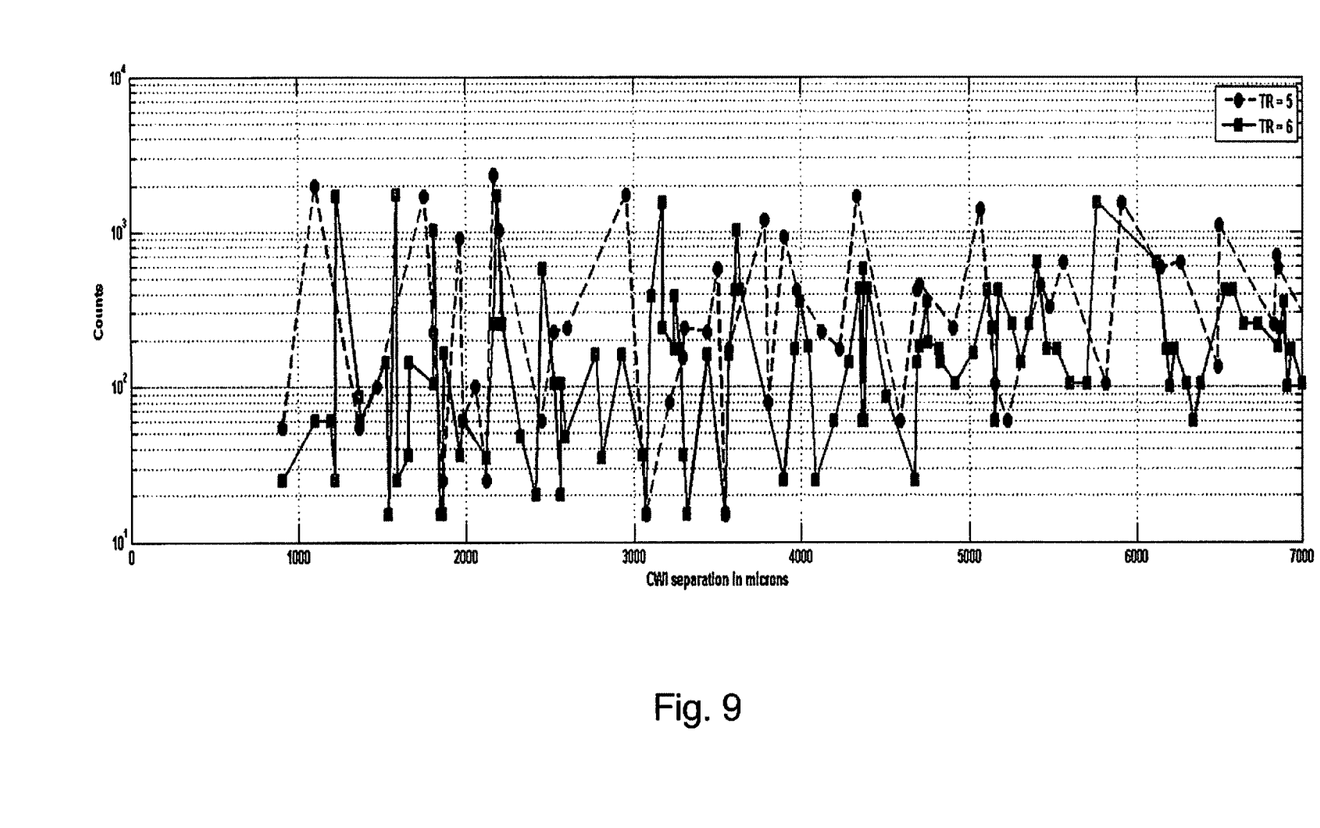
FIG. 9 is a graphical illustration of CWI separation distance spectra for a certain tape format applying different numbers of track rotations.

Here another representative example is pursued, which generates numerical results using LTO tape layouts. For example, the distance spectra for LTO 6 Tape Layout with different track rotations can be utilized (Note that TR=6 is what the LTO 6 format adapted). It is appreciated that CWI allocation tables are not specifically provided herein as they may occupy a lot of space, and may otherwise obscure what is intended as the present invention. For this particular example, certain parameters are set at T=16, S=32, and N=96, and the general methodology set out in detail above is utilized. It is further assumed that there is an inter-track distance of 166 u and an inter-set distance of 360 u, which are based on LTO 6 density operating points. It is appreciated that these specific numbers are being utilized simply for purposes of demonstration, and the numbers can be varied based on the specific tape format being utilized. Since each SDS is equally important from a storage point of view, WSC(0), WSC(1), . . . , WSC(31) are considered all together, with one CWI separation distance spectrum being created as shown in FIG. 9 for TR=5 and TR=6 with SDSS 2. More particularly, FIG. 9 is a graphical illustration of CWI separation distance spectra for a certain tape format applying different numbers of track rotations. As illustrated, the CWI separation distance spectra for LTO 6 tape format using TR set at 5 is shown in a dashed line, and the CWI separation distance spectra for LTO 6 tape format using TR set at 6 is shown in a solid line.

Since each separation point has different vulnerability to defects and correlated errors, it is understood that the $\alpha_i$ values are different. In this example, it is assumed that:
$\alpha_1=0.83$, $\alpha_2=0.79$, $\alpha_3=0.71$, $\alpha_4=0.22$, $\alpha_5=0.02$ and $\alpha_{i>5}=0$ In computing the WSC for TR=5 and TR=6, it is shown that the design with TR=5 has a WSC of ~1610 whereas the design with TR=6 has a WSC of ~150. As can be seen, the design with TR=5 gives better separation distance properties given the defect statistics. If the coefficients had instead been set at $\alpha_1=1.00$, $\alpha_{i>1}=0$, in other words, if only minimum separation distance had been considered, the conclusion would not change. However, in that case, WSCs will be 55 and 25, respectively. Note that the difference is not significant anymore.

As provided herein, using the tape layout optimization system having features of the present invention, certain advantages can be realized. In particular, based on the apparatus and stated claims in this disclosure, a more robust and adaptive tape layout design shall be obtained. The present disclosure has also introduced performance measures to compare different layouts. Based on the proposal and performance metrics provided herein, it can be demonstrated that a design that takes into account the actual error statistics while optimizing the parameters of the design layout will not only benefit current LTO tape formats, but also LTO tapes down the road. More specifically, the tape layout optimization system as disclosed herein is better able to provide a more balanced design with better overall distance properties than competing layout systems. The present tape layout optimization system and method can also potentially increase data reliability or enable increased operating linear densities or smaller head widths/characteristics for a given reliability level.

Additionally, it is understood that although a number of different embodiments of the tape layout optimization system 111 have been illustrated and described herein, one or more features of any one embodiment can be combined with one or more features of one or more of the other embodiments, provided that such combination satisfies the intent of the present invention.

While a number of exemplary aspects and embodiments of the tape layout optimization system 111 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A tape layout module for determining a tape layout allocation strategy for laying out data on a magnetic tape, the data being organized into a plurality of fixed-size subdata sets with each of the plurality of subdata sets including a plurality of codeword interleaves, the tape including a plurality of media defect characteristics, the tape layout module comprising:
a tape layout optimization system including a processor that receives information on the plurality of media defect characteristics, the tape layout optimization system determining the tape layout allocation strategy based at least in part on at least one of the plurality of media defect characteristics, the tape layout optimization system determining the tape layout allocation strategy further based on distance spectra between pairs of the plurality of codeword interleaves.

2. The tape layout module of claim 1 wherein the tape layout optimization system determines the tape layout allocation strategy based at least in part on each of the plurality of media defect characteristics.

3. The tape layout module of claim 1 wherein the plurality of media defect characteristics are reproducible.

4. The tape layout module of claim 1 wherein the tape layout optimization system generates a plurality of coefficients, $\alpha_i(b_i)$, that are the result of a modeling of the plurality of media defect characteristics.

5. The tape layout module of claim 4 wherein the tape layout optimization system determines the tape layout allocation strategy by computing a weighted separation coefficient (WSC), $WSC(s)=\alpha_1(b_1)c_1+\alpha_2(b_2)c_2+\ldots+\alpha_U(b_U)c_U$, where $b_i$ represents the i-th unique element of a distance spectra between pairs of the plurality of codeword interleaves, a represents the count of the unique element $b_i$, and U represents the set of all possible distances for a given layout.

6. The tape layout module of claim 1 wherein the tape layout optimization system determines the tape layout allocation strategy by selectively utilizing at least one tape layout parameter.

7. The tape layout module of claim 6 the tape layout optimization system determines the tape layout allocation strategy by selectively utilizing a plurality of tape layout parameters.

8. The tape layout module of claim 7 wherein the plurality of tape layout parameters are selected from a group consisting of track swaps, codeword interleave set swaps, track rotations, and odd/even indexed subdata set separations.

9. A data flow system for a tape drive comprising (i) a data intake system that receives a plurality of variable-length data blocks from a host device; (ii) a data preprocessing system that converts the plurality of variable-length data blocks into a plurality of fixed-size data sets, the data preprocessing system then converting the plurality of fixed-size data sets into a plurality of fixed-size subdata sets with each of the plurality of subdata sets including a plurality of codeword interleaves; and (iii) the tape layout module of claim 1 that determines a tape layout allocation strategy for laying out the plurality of codeword interleaves on tape.

10. A method for determining a tape layout allocation strategy for laying out data on tape, the data being organized into a plurality of fixed-size subdata sets with each of the plurality of subdata sets including a plurality of codeword interleaves, the tape including a plurality of media defect characteristics, the method comprising the steps of:
receiving information on the plurality of media defect characteristics with a tape layout optimization system including a processor; and
determining the tape layout allocation strategy with the tape layout optimization system based at least in part on at least one of the plurality of media defect characteristics, and further based on distance spectra between pairs of the plurality of codeword interleaves.

11. The method of claim 10 wherein the step of determining includes determining the tape layout allocation strategy with the tape layout optimization system based at least in part on each of the plurality of media defect characteristics.

12. The method of claim 10 wherein the plurality of media defect characteristics are reproducible.

13. The method of claim 10 further comprising the step of generating a plurality of coefficients, $\alpha_i(b_i)$, with the tape layout optimization system that are the result of a modeling of the plurality of media defect characteristics.

14. The method of claim 10 wherein the step of determining includes determining the tape layout allocation strategy with the tape layout optimization system by selectively utilizing at least one tape layout parameter.

15. The method of claim 10 wherein the step of determining includes determining the tape layout allocation strategy with the tape layout optimization system by selectively utilizing a plurality of tape layout parameters.

16. The method of claim 15 wherein the plurality of tape layout parameters are selected from a group consisting of track swaps, codeword interleave set swaps, track rotations, and odd/even indexed subdata set separations.

17. A tape layout module for determining a tape layout allocation strategy for laying out data on a magnetic tape, the data being organized into a plurality of fixed-size subdata sets with each of the plurality of subdata sets including a plurality of codeword interleaves, the tape including a plurality of media defect characteristics, the tape layout module comprising:
a tape layout optimization system including a processor that receives information on the plurality of media defect characteristics, the tape layout optimization system determining the tape layout allocation strategy based at least in part on at least one of the plurality of media defect characteristics; and wherein the tape layout optimization system generates a plurality of coefficients, $\alpha_i(b_i)$, that are the result of a modeling of the plurality of media defect characteristics.

18. The tape layout module of claim 17 wherein the tape layout optimization system determines the tape layout allocation strategy by computing a weighted separation coefficient (WSC), $WSC(s)=\alpha_1(b_1)c_1+\alpha_2(b_2)c_2+\ldots+\alpha_U(b_U)c_U$, where $b_i$ represents the i-th unique element of a distance spectra between pairs of the plurality of codeword interleaves, $c_i$ represents the count of the unique element $b_i$, and U represents the set of all possible distances for a given layout.

19. A method for determining a tape layout allocation strategy for laying out data on tape, the data being organized into a plurality of fixed-size subdata sets with each of the plurality of subdata sets including a plurality of codeword interleaves, the tape including a plurality of media defect characteristics, the method comprising the steps of:
receiving information on the plurality of media defect characteristics with a tape layout optimization system including a processor;
determining the tape layout allocation strategy with the tape layout optimization system based at least in part on at least one of the plurality of media defect characteristics; and
generating a plurality of coefficients, $\alpha_i(b_i)$, with the tape layout optimization system that are the result of a modeling of the plurality of media defect characteristics.

20. The method of claim 13 wherein the step of determining includes determining the tape layout allocation strategy with the tape layout optimization system by computing a weighted separation coefficient (WSC), $WSC(s)=\alpha_1(b_1)c_1+\alpha_2(b_2)c_2+\ldots+\alpha_U(b_U)c_U$, where $b_i$ represents the i-th unique element of a distance spectra between pairs of the plurality of codeword interleaves, $c_i$ represents the count of the unique element $b_i$, and U represents the set of all possible distances for a given layout.

* * * * *

UNITED STATES PATENT AND TRADEMARK OFFICE
CERTIFICATE OF CORRECTION

PATENT NO. : 10,014,025 B1
APPLICATION NO. : 15/655289
DATED : July 3, 2018
INVENTOR(S) : Arslan et al.

Page 1 of 1

It is certified that error appears in the above-identified patent and that said Letters Patent is hereby corrected as shown below:

In the Claims

Column 16, Line 13, replace "a represents" with --ci represents--;
Column 18, Line 1, replace "a represents" with --ci represents--.

Signed and Sealed this
Twenty-first Day of August, 2018

Andrei Iancu
*Director of the United States Patent and Trademark Office*